US009082385B2

(12) United States Patent
Rubman et al.

(10) Patent No.: US 9,082,385 B2
(45) Date of Patent: Jul. 14, 2015

(54) ELECTRIC MUSICAL INSTRUMENT

(71) Applicant: Gittler Instruments LLC, Islandia, NY (US)

(72) Inventors: Russell S. Rubman, Port Jefferson, NY (US); Colin D. Joye, Springfield, VA (US)

(73) Assignee: Gittler Instruments LLC, Islandia, NY (US)

( * ) Notice: Subject to any disclaimer, the term of this patent is extended or adjusted under 35 U.S.C. 154(b) by 139 days.

(21) Appl. No.: 13/957,140

(22) Filed: Aug. 1, 2013

(65) Prior Publication Data

US 2014/0033905 A1 Feb. 6, 2014

Related U.S. Application Data

(60) Provisional application No. 61/679,179, filed on Aug. 3, 2012, provisional application No. 61/748,825, filed on Jan. 4, 2013.

(51) Int. Cl.

| | |
|---|---|
| ***G01D 3/00*** | (2006.01) |
| ***G10H 3/18*** | (2006.01) |
| ***G10H 1/32*** | (2006.01) |

(52) U.S. Cl.
CPC ................ *G10H 3/181* (2013.01); *G10H 1/32* (2013.01); *G10H 2220/051* (2013.01)

(58) Field of Classification Search
USPC .............................................. 84/290
See application file for complete search history.

(56) References Cited

U.S. PATENT DOCUMENTS

| | | | | |
|---|---|---|---|---|
| 1,717,677 | A * | 6/1929 | Glasel | 84/297 S |
| 3,515,026 | A * | 6/1970 | Rohrbough | 84/286 |
| 3,943,815 | A * | 3/1976 | Gilbert | 84/293 |
| 4,079,652 | A * | 3/1978 | Gittler | 84/743 |
| 4,715,259 | A * | 12/1987 | Wittman | 84/327 |
| 5,920,023 | A * | 7/1999 | Ravagni et al. | 84/485 R |
| 6,452,081 | B1 * | 9/2002 | Ravagni et al. | 84/477 R |
| 8,188,354 | B2 * | 5/2012 | Mercer | 84/327 |

* cited by examiner

*Primary Examiner* — Jianchun Qin

(74) *Attorney, Agent, or Firm* — Buckley, Maschoff & Talwalkar LLC

(57) ABSTRACT

According to some embodiments, a stringed musical instrument is provided. The stringed musical instrument comprises a neck portion, a body portion coupled to the neck portion, and a strap anchor system attached to the body portion comprising a strap arm and strap arm wheel.

16 Claims, 15 Drawing Sheets

FIG. 1
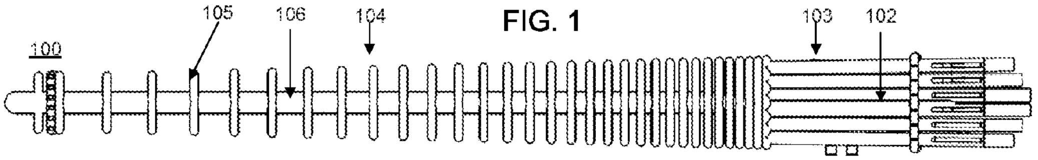
FIG. 1A
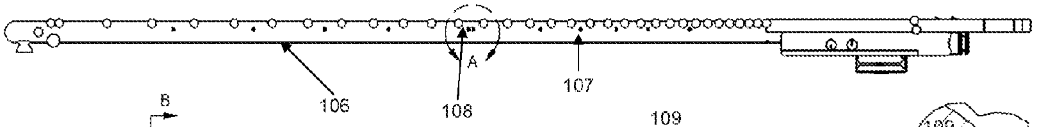
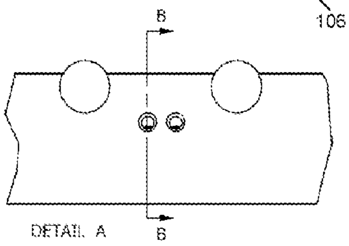
FIG. 1B
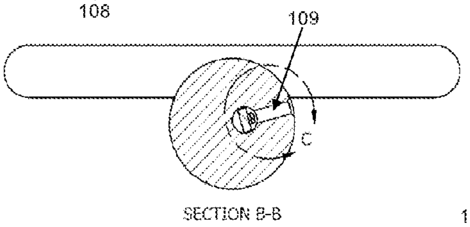
FIG. 1C
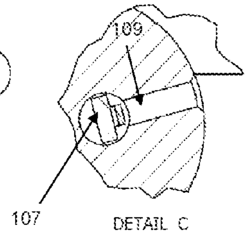
FIG. 1D 300
308
309

301

A
A
301

302
301
303
304
305
306
307

304
303
305

FIG. 7E
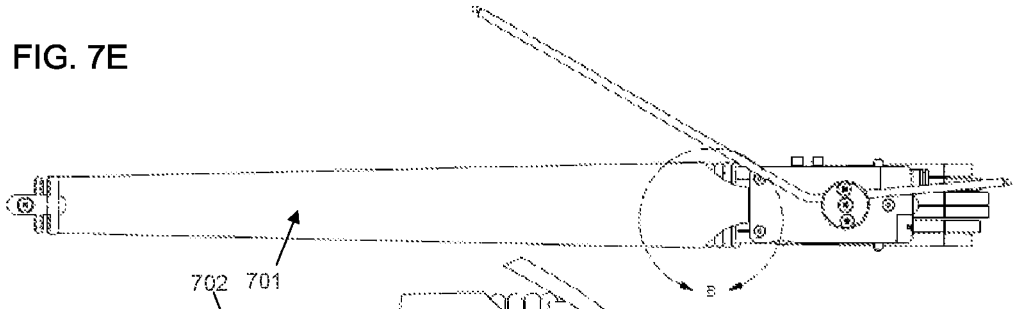
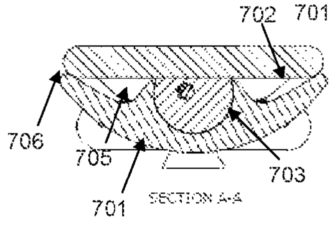
FIG. 7F
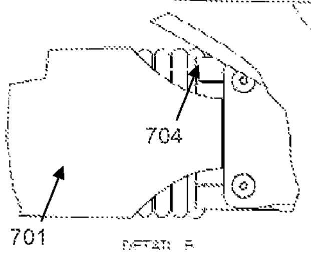
FIG. 7G

ELECTRIC MUSICAL INSTRUMENT

CROSS REFERENCE TO RELATED APPLICATIONS

The present application claims the benefit of priority of U.S. Provisional Patent Application No. 61/679,179 filed Aug. 3, 2012 and U.S. Provisional Patent Application No. 61/748,825 filed Jan. 4, 2013, the contents of which are incorporated herein in their entirety for all purposes.

BACKGROUND

Most conventional electric stringed musical instruments, such as, but not limited to, guitars, basses, banjos, mandolins, and violins have wooden bodies with wooden necks. However, some musical instruments may be constructed using metals and/or metal alloys. Metal instruments are often built using conventional shapes that comprise metal bodies with wooden necks or metal bodies with metal necks.

BRIEF DESCRIPTION OF THE DRAWINGS

FIG. 1 illustrates a top view of a musical instrument according to some embodiments.

FIG. 1A illustrates a side view of a musical instrument according to some embodiments.

FIG. 1B illustrates a portion of fret marker lighting according to some embodiments.

FIG. 1C illustrates a portion of fret marker lighting according to some embodiments.

FIG. 1D illustrates a portion of fret marker lighting according to some embodiments.

FIG. 7E illustrates a neck guard according to some embodiments.

FIG. 7F illustrates a cutaway view of a neck guard according to some embodiments.

FIG. 7G illustrates a neck guard according to some embodiments.

DETAILED DESCRIPTION

Figure 2:
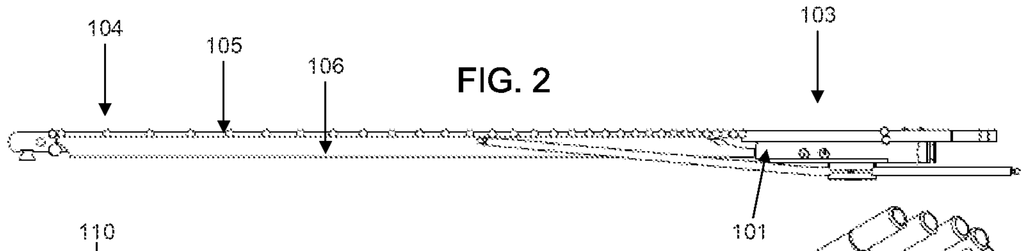
FIG. 2 illustrates a side view of a musical instrument according to some embodiments.

Referring now to FIGS. 1, 1A, 1B, 1C, 1D, 2, 2A and 2B, an embodiment of a stringed musical instrument 100 is illustrated. In some embodiments, FIGS. 1 through 2B relate to a Gittler style musical instrument. The stringed musical instrument 100 has a neck portion 104 and a body portion 103. The neck portion 104 may be formed by a single longitudinal metal rod 106 that is crossed by a plurality of metal frets 105. A plurality of pickups 102 may be longitudinally mounted to the longitudinal metal rod 106 to form the body portion 103. The metal frets 105 may be progressively shorter from a longest metal fret 105 that is closest to the body portion 103 to a shortest metal fret 105 located at a distal end of the neck portion 104. The metal frets 105 may be fixed perpendicular across the longitudinal metal rod 106 and extend a distance greater than a width of the longitudinal metal rod 106. In some embodiments, the metal frets 105 may be bisected by the longitudinal metal rod 106.

In some embodiments, the musical instrument 100 comprises an electronics box ("ebox") 101 that is fastened to the body portion 103. The ebox 101 may comprise a box mounted adjacent to (e.g., behind) the plurality of pickups 102. The plurality of pickups 102 may also serve as tuners to adjust tension of one or more strings. The ebox 101 may contain (a) electronics for the amplification and distribution of the plurality of pickups 102, (b) electronics to drive fretmarker lighting (c) jacks for electrically coupling the musical instrument 100 to external equipment, (d) controls (e.g., tone and/or volume, pickup selection, phasing, parallel combination of pickups, serial combination of pickups) (e) physical protection of the wiring coming from the plurality of pickups, and (f) one or more strap anchor points for affixing the stringed musical instrument 100 to a strap that may be worn by a user. Strap anchor points will be described in more detail with respect to FIGS. 8A through 8D.

The ebox 101 may also act as a housing for electronics on printed circuit boards that provide connectivity to the stringed musical instrument 100 (e.g., a combined mono output from the plurality of pickups 102 and/or a multi-channel format such as a hexaphonic (six-channel output)). The electronics may be configured to allow one or more of the following variations: (i) Use of a standard ¼" jack with mono output (e.g., tip and sleeve). Power may be provided by a battery 112 inside the ebox 101 that is engaged (turned on) when the ¼" jack is coupled to the ebox 101. The volume control may also be activated upon connectivity of the ¼" jack. (ii) Use of a powered ¼" jack (as will be described below with respect to FIG. 5) which may comprise a stereo ¼" jack (e.g., a Tip-Ring-Sleeve arrangement) by which power may delivered to the electronics of the ebox 101 by, for example, the ring portion of the ¼" jack. (iii) Use of a standard D-13 (e.g., DIN-13, having 13 pins) connector which may allow signals associated with the plurality of pickups 102 to be sent out of the ebox in a multi-channel format (e.g., quadraphonic, pentaphonic, hexaphonic, heptaphonic, or octaphonic) to facilitate individual processing of individual pickups of the plurality of pickups 102. Having the option of a multi-channel format, a user may desire to connect their musical instrument 100 to a computer to control each channel associated with one or more pickups individually. The D-13 jack may also provide power to a fretmarker lighting system and active electronics system. The D-13 jack and ¼" jack method (powered stereo or standard mono) may be used simultaneously without damage or interference.

In one embodiment, the ebox 101 may comprise a volume control knob and two buttons that are user-definable. The user-definable buttons may function when the ebox 101 is connected to an external computer via the D-13 jack. The volume control knob may adjust an output level (e.g., a volume) of a signal sent via the ¼" jack.

Figure 2A:
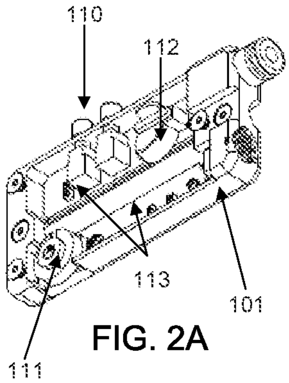
FIG. 2A illustrates an ebox according to some embodiments.
Figure 2B:
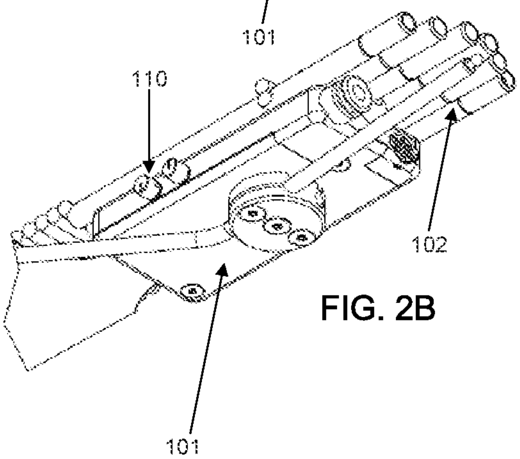
FIG. 2B illustrates an ebox according to some embodiments.

According to some embodiments, FIG. 2A may illustrate internal components of the ebox 101 coupled to printed circuit boards 113. In one embodiment, the ebox 101 may comprise a volume control knob 111 and two tone control knobs 110. Each tone control knob 110 may comprise a tactile switch button that is user-definable when hooked up to an external computer via the D-13 port. The tactile switches may work to step forward or backward MIDI patches on many external MIDI controller systems, such as, but not limited to, a Roland VG-88. The volume control knob 111 may adjusts a volume on the ¼" jack, and may also send a DC signal through the D-13 port to signify the volume level to a MIDI controller system or computer. In this latter configuration, the volume control knob 111 may be used to control other functions as defined in an external computer program.

Most conventional stringed musical instruments have some form of visual aids, often small dots, by which a musician can tell, at a glance, a position on the neck of the musical instrument 100. The ebox 101 may house electronics to drive a fretmarker lighting system which may function as a visual aid for a musician to determine a position on the neck 104 of the musical instrument 100. The fretmarker lighting system may comprise a plurality of lights, such as, but not limited to, light emitting diodes ("LED") 107/108 that visually display specific locations between frets of the musical instrument to provide visible identification of positions on the neck 104.

In one embodiment, the fretmarker lighting system comprises a constant-current switch-mode power supply ("SMPS") to boost a system voltage (5 to 7 volts DC) to a higher voltage as needed to drive the plurality of LEDs 107/108. In some embodiments, the fretmarker lighting system does not require a SMPS to drive the plurality of LEDs 107/108. In some embodiments, instead of LEDs other illuminating aids may be implemented (e.g., fiber optic, fluorescent lamp, electroluminescent lamp, etc.). The illustrated embodiments disclose fretmarkers after a 2nd, $4^{th}$, $6^{th}$, and $8^{th}$ frets with each fretmarker comprising a single LED 107. A double LED 108 fretmarker is located between the $11^{th}$ and $12^{th}$ frets to indicate an octave.

LEDs 107/108 may be installed on a very long and thin custom circuit board which may be inserted into a long thin bore that is drilled into the longitudinal metal rod 106. Fretmarker holes 109 may be drilled perpendicular to this long bore to allow light to shine out of the longitudinal metal rod 106. The holes 109 may be backfilled with clear or colored resin or plastic light pipes to enhance a viewability angle. Furthermore, the fretmarkers may comprise various or multiple fretmarker colors, shapes, sizes, patterns, or a number of lighting holes. The locations of the lighting holes 109 or any materials inserted into the holes 109 may also vary.

The stringed musical instrument 100 may be comprised of titanium or stainless steel. Titanium presents an advantage over stainless steel as being just over half the total weight of stainless steel while maintaining the rigidity and hardness. Titanium demonstrates superior damage tolerance over other alloys and exhibits a high ratio between strength and density of metallic material. Moreover, titanium has a crystalline structure of close-packed hexagonal grains, which may allow for optimum transfer of acoustic energy. Since titanium is known to oxidize and gray with time, as well as be susceptible to some kinds of stains, an aerospace Teflon impregnation coating may be used on the surface to (a) resist scratching, (b) provide a very smooth feel, (c) eliminate the color changing and staining, (d) improve the wear resistance of the fret surfaces. The coating may make the color of the musical instrument a uniform medium, matte gray. This may be accomplished by a TIODIZE type IV coating process. Other coatings may be applied, such as but not limited to, titanium-nitride, titanium-aluminum-nitride, chromium-nitride, titanium-carbide, anodization, or other coatings.

Figure 13:
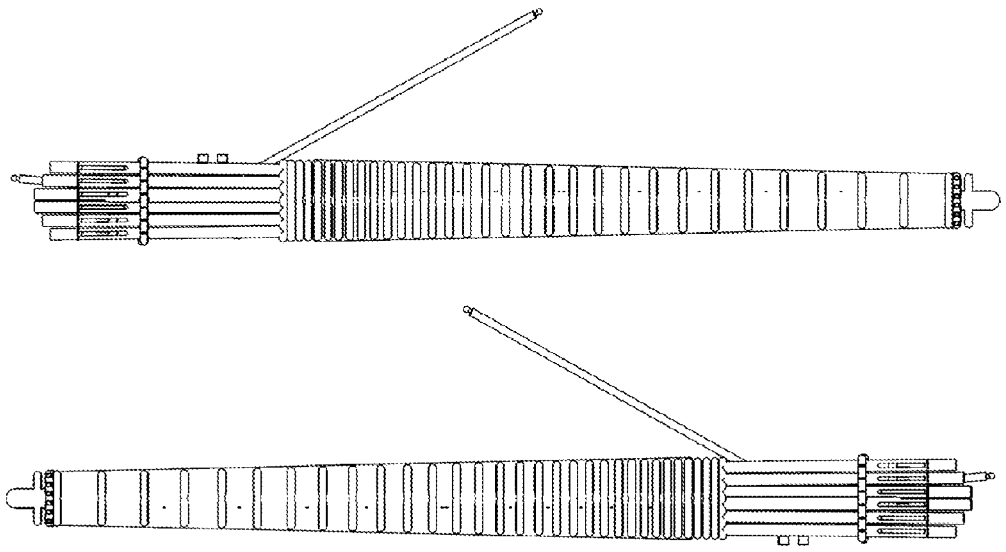
FIG. 13 illustrates a musical instrument according to some embodiments.

Electronics in the stringed musical instrument 100 may comprise active electronics, meaning powered, and therefore capable of amplifying the musical instrument signals. An internal battery may provide up to 2000 hours of use when a standard ¼" musical instrument plug is used. The active electronics may also be powered by an external source. Tone shaping circuitry may be employed to create a pleasing tone profile for the musical instrument's sound. The musical instrument 100 may be capable of being played right handed or left handed as illustrated in FIG. 13 with minor adjustments to the strap arm system in FIGS. 8, 8A, 8B, and 8C.

Figures 3, 3A, 3B, 3C, 3D:
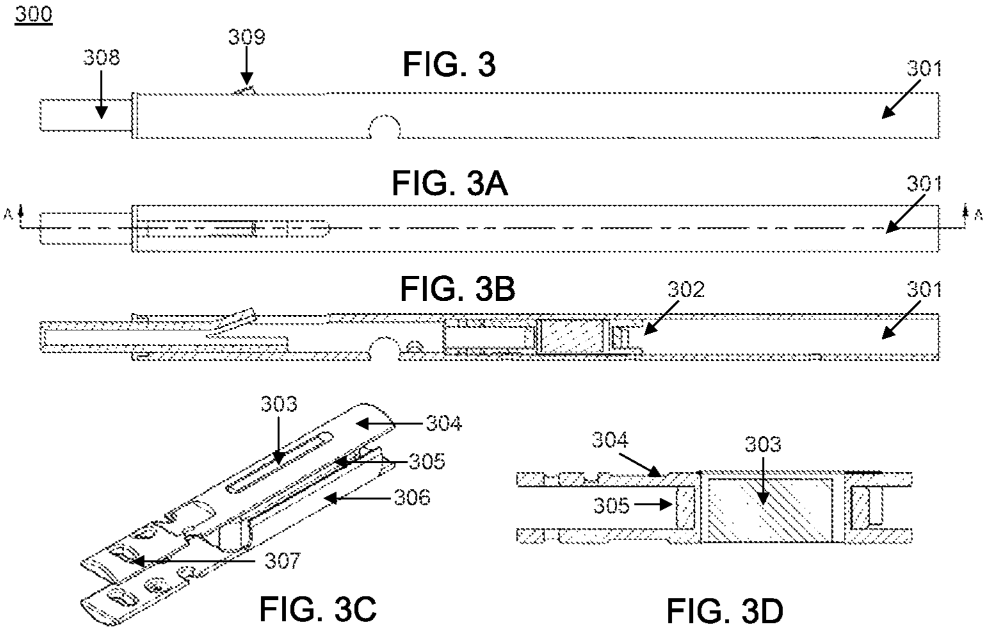
FIG. 3 illustrates a musical instrument pickup according to some embodiments.
FIG. 3A illustrates a musical instrument pickup according to some embodiments.
FIG. 3B illustrates a musical instrument pickup according to some embodiments.
FIG. 3C illustrates a musical instrument pickup assembly according to some embodiments.
FIG. 3D illustrates a musical instrument pickup assembly according to some embodiments.

Now referring to FIGS. 3, 3A, 3B, 3C, and 3D, an embodiment of a musical instrument pickup 300 is illustrated. FIG. 3 may illustrate a side view of the musical instrument pickup 300. FIG. 3A may illustrate a top view of the musical instrument pickup 300. FIG. 3B may illustrate a cutaway view of the musical instrument pickup 300. Each pickup 300 may be used in a multi-channel format and thus may require a high degree of isolation from neighboring pickups, as well as a high output voltage. Each pickup 300 may comprise a pickup assembly 302 that is housed in a metal tube 301 (e.g., inserted). Each pickup assembly 302 may comprise a magnet 303, a bobbin 304, a coil 305, and optionally, a pole piece 306. The magnet 303 may comprise AlNiCo 5, AlNiCo 8, NdFeB or other magnet materials. The coil 305 may comprise several thousand turns of varnished copper wire, 42 to 52 AWG in size, and the coil 305 may be wound on the bobbin 304. The bobbin 304 may comprise molded-in metal pins for soldering leads to the pickup and for affixing the magnet wire by solder.

In some embodiments the pole piece 306 may comprise a magnetic material and thus the pole piece 306 may be a magnetic pole piece. In some embodiments, magnet polepieces may focus the magnetic fields toward the nearest string and away from neighboring strings to reduce crosstalk. Also, the magnetic pole pieces may serve to focus the magnetic fields closer to a top of the pickup. The pole piece 306 may extend a length of the pickup 300. In addition, each pickup assembly 302 may be dipped in wax, epoxy or other suitable material (not shown) to constrain the coil windings to prevent microphonic noise. The bobbin 304 may include features 307 for affixing and soldering the magnet wire and external lead wires (not shown) and is made from substantially insulating materials such as plastics.

Additionally, each pickup assembly 302 may be surrounded by a heat-shrink tubing material (not shown) to keep out water vapor and to further protect the coils. The leads (wires) coming out of the pickup are also not shown in the diagram. The present embodiments may increase output voltage over similar pickups by a magnitude of five or ten times as well as reduce crosstalk between neighboring pickups from −10 dB in conventional designs to approximately −24 dB in the present pickups 300.

The pickups 300, when used in a multi-channel output require a high degree of isolation from neighboring pickups, but no "dead" zones between pickups, and also require a pleasing tone and a high output voltage. Each pickup 300 may comprise vertically-oriented magnetic field to detect a string nearest the pickup, a plurality of turns of fine magnet wire on a very small pickup bobbin in order to obtain significant voltage output and increased inductance, a short total pickup length of approximately 0.2 inch to 1 inch, and placement of the pickup near the bridge to prevent "dead zones" between pickups that may cause a signal to fade when a string is bent out of its normal position to achieve a pitch-bending effect. The pickups 300 may also comprise tuners that comprise an adjustment screw 308 and a moveable anchor 309 to secure a string to be tuned. Turning the adjustment screw 308 may move the moveable anchor 309 to adjust a tension (e.g., pitch) of a string.

Figures 4, 4A, 4B, 4C:
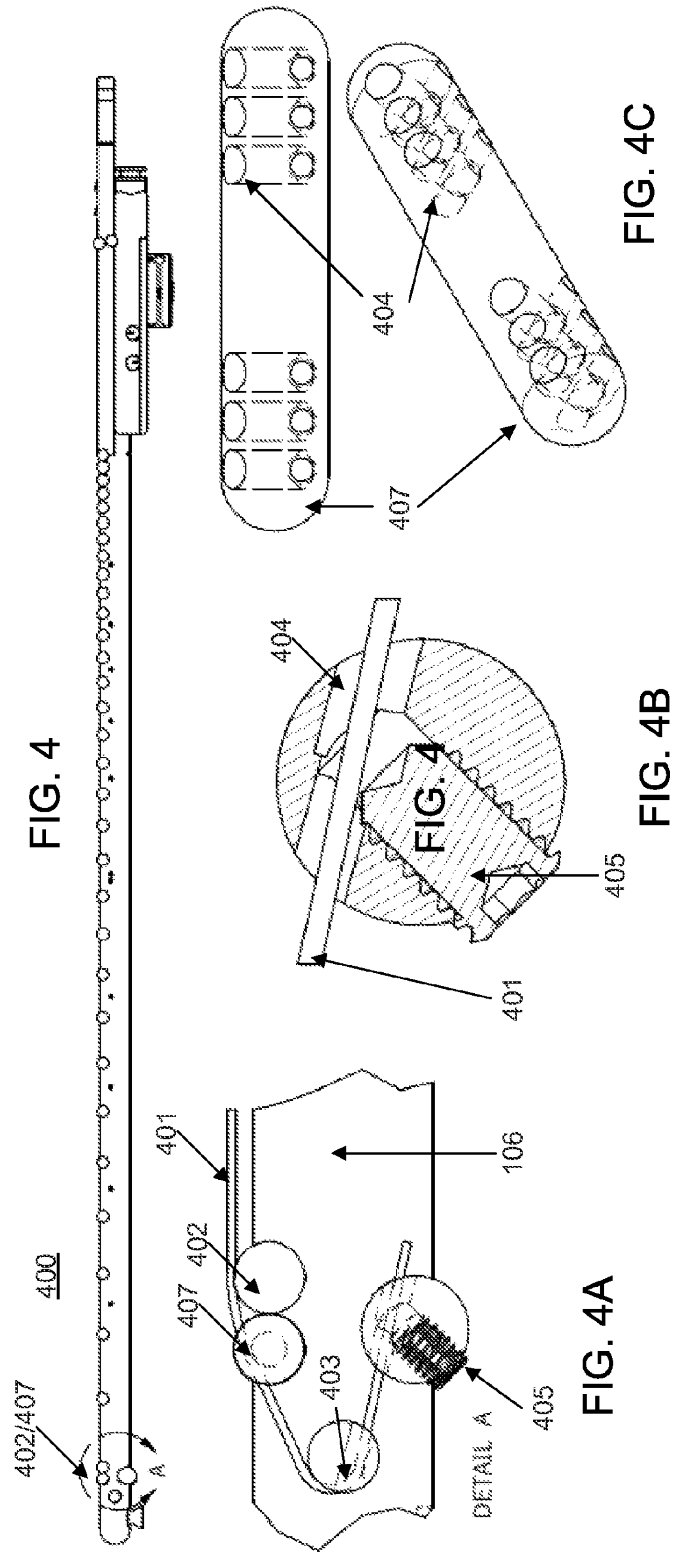
FIG. 4 illustrates a portion of a string fastener according to some embodiments.
FIG. 4A illustrates a portion of a string fastener according to some embodiments.
FIG. 4B illustrates a portion of a string fastener according to some embodiments.
FIG. 4C illustrates a portion of a string fastener according to some embodiments.

Now referring to FIGS. 4, 4A, 4B and 4C, an embodiment of a string fastening mechanism 400 at a headstock of a stringed musical instrument is illustrated. As illustrated in FIG. 4, string 401 may be indicative of how a string might be positioned on the headstock of the stringed musical instrument.

At a headstock, the string 401 may be pulled around a zero fret 402 (e.g., a fret furthest from the plurality of pickups), through or around the string peg 403, and threaded into a wire channel 404. In some embodiments, the zero fret may comprise two frets 402 and 407 and the fret 407 may comprise openings to receive each string 401. A set screw 405 may be pressed onto the musical instrument string and thus the set screw 405 may clamp the string 401 to lock it in place. Using one hand, a musician may pretension the string effectively by pulling it through, while tightening the set screw 405 with the other hand. In this fashion, the tuners located adjacent to the pickups may have only a short distance to travel in order to tune a respective string 401. The relatively tight turn of the string at the string peg 403 may further prevent slippage by employing a tight radius of curvature.

Figure 5:
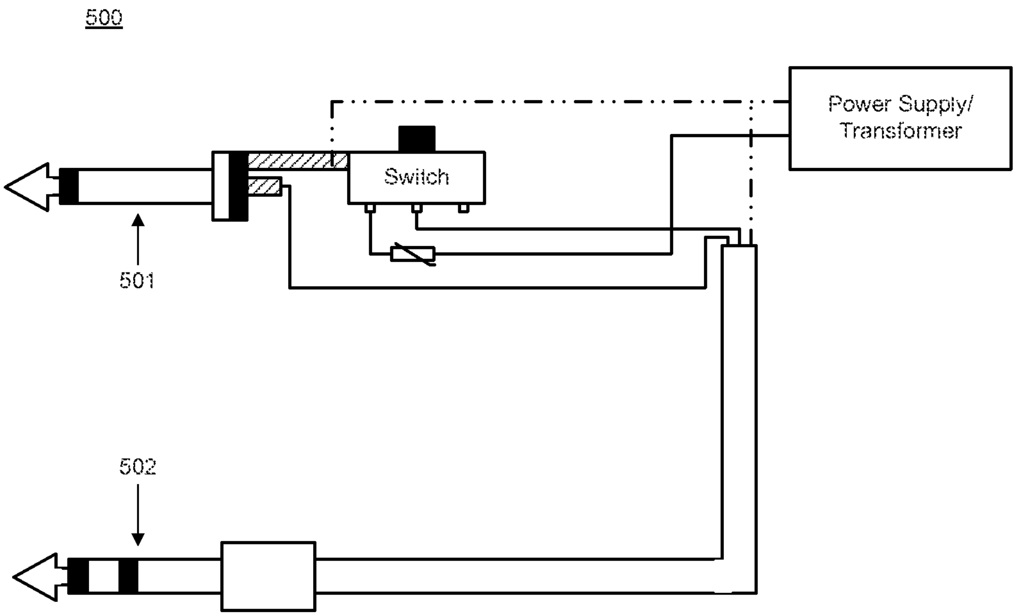
FIG. 5 illustrates a powered cable according to some embodiments.

Now referring to FIG. 5, an embodiment of a powered cable 500 is illustrated. The powered cable 500 may comprise a mono plug 501 and a stereo plug 502. The powered cable 500 may provide power to the fretmarker lighting system and the active electronics, the circuitry may be capable of accepting a stereo plug 502 (e.g., a ¼" plug) that provides 5-7 volts through the ring portion of a typical stereo Tip, Ring, Sleeve ("TRS") plug. In some embodiments, the ring portion may provide voltage in a range of 3-12 volts. In one embodiment, on one end, the powered cable 500 comprises a stereo TRS plug with a 90-degree bend to allow the musician easy access to the tuners that are near the ¼" jack on the box and on the other end, the powered cable 500 comprises a standard ¼" mono plug that may interface with (e.g., be plugged into) a standard amplifier or other audio equipment.

The powered cable 500 may also be electrically coupled to a wall-wart style transformer to plug into an AC power socket (e.g., an AC/DC converter external power supply that plugs into a wall socket) to supply the power to the musical instrument. An on/off switch may be built into the mono-end of the plug to control power to the stringed musical instrument. In an "on" mode, the fretmarker lights may turn on (the active electronics may be turned on the moment any ¼" jack is inserted). In an "off" mode, the cable may behave like any standard musical instrument cable, and the stringed musical instrument may rely solely on its internal battery to power the active electronics, while the fretmarker lights are off.

Figure 6:
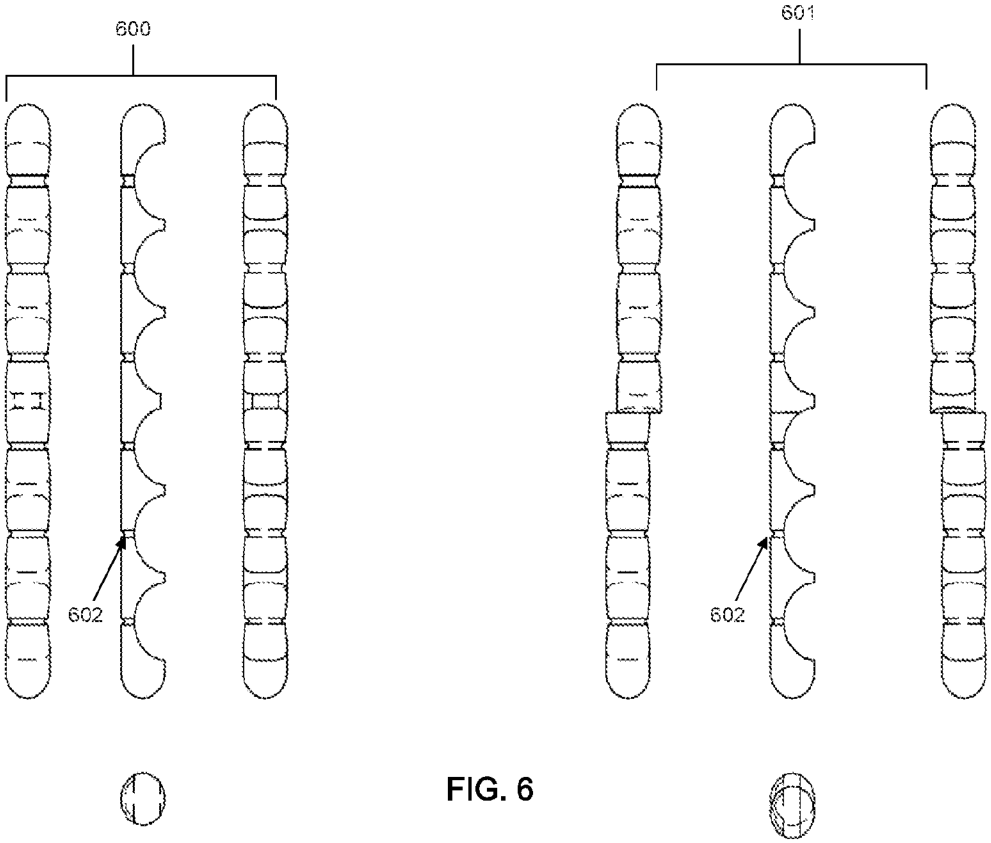
FIG. 6 illustrates embodiments of a musical instrument bridge.
Figures 7, 7A, 7B, 7C, 7D:
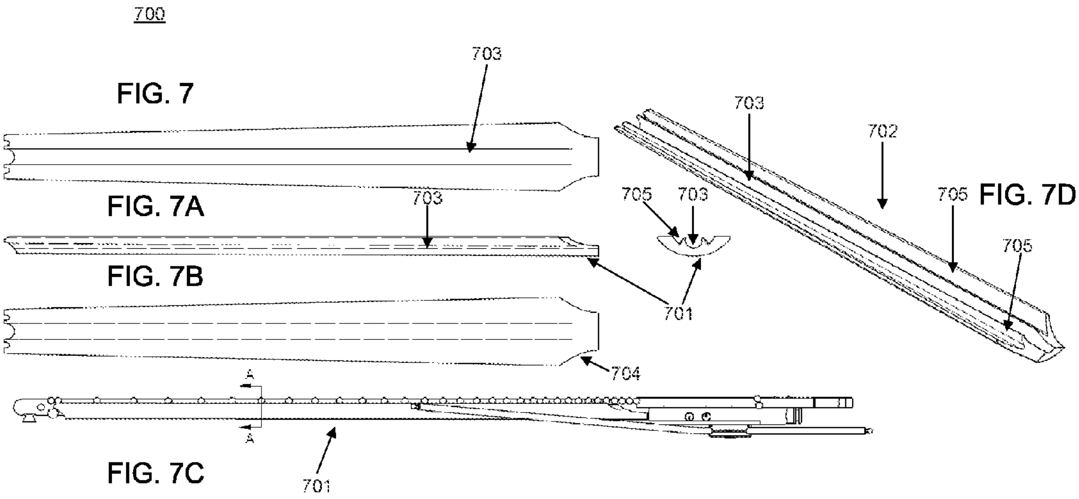
FIG. 7 illustrates a neck guard according to some embodiments.
FIG. 7A illustrates a neck guard according to some embodiments.
FIG. 7B illustrates a neck guard according to some embodiments.
FIG. 7C illustrates a neck guard according to some embodiments.
FIG. 7D illustrates a perspective view of a neck guard according to some embodiments.
Figure 8:
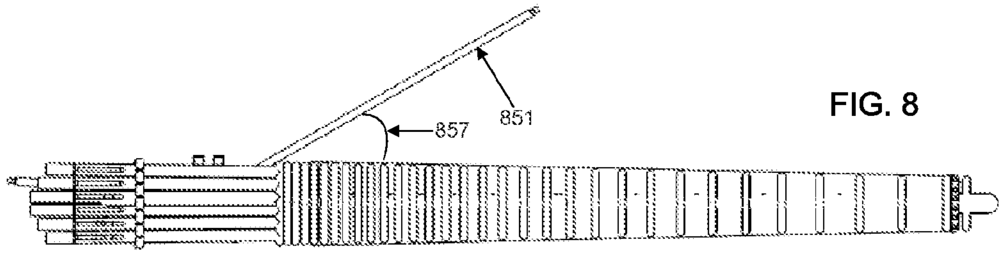
FIG. 8 illustrates a strap anchor system according to some embodiments.
Figure 8A:
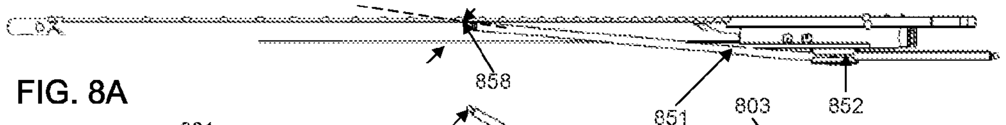
FIG. 8A illustrates a strap anchor system according to some embodiments.
Figure 8B:
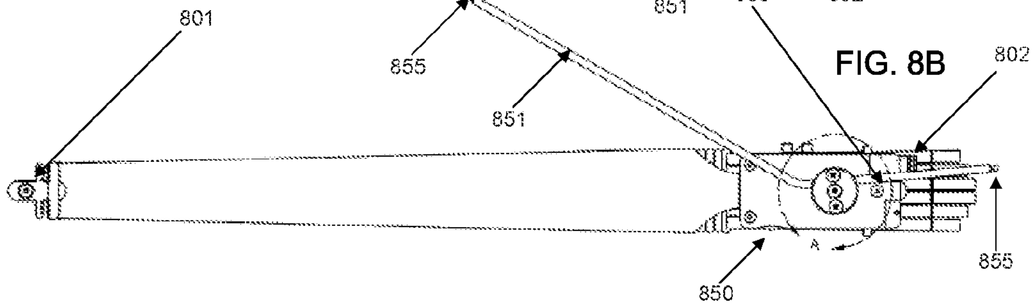
FIG. 8B illustrates a strap anchor system according to some embodiments.
Figure 8C:
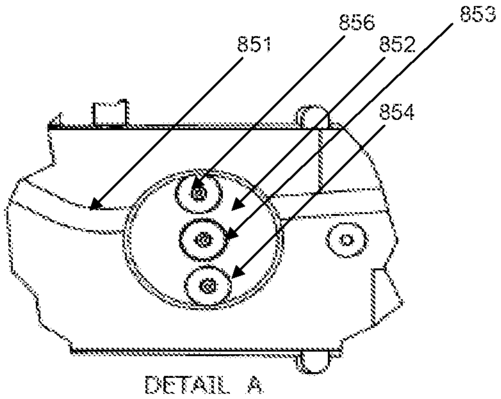
FIG. 8C illustrates a strap anchor system according to some embodiments.

Now referring to FIG. 6, embodiments of adjustable bridges 600 and 601 are illustrated according to some embodiments. The adjustable bridges 600/601 may provide an ability to correct intonation of a string and a height of the string. A top view, side view, and bottom view of each bridge 600/601 is illustrated respectively. Each bridge 600/601 may comprise a tonal anchor point for a string, and thus the bridge 600/601 has a direct effect on an accuracy of the pitches when the string is pressed onto the frets. A straight bridge 600 may comprise grooves 602 to firmly hold strings in place. A height of the strings above the frets may be adjusted by simply installing another bridge with a different string height (as viewed according to a respective side view). The bridge 600 can also be rotated slightly to obtain a gradual intonation shift from string to string. To compenesate for many common types of intonation problems, a split bridge 601 may also be used wherein the location of the string contacts the split bridge 601 may vary from one string to another. The split bridge 601 may also be rotated slightly to obtain a gradual intonation shift from string to string. The split bridge 601 may be split in a variety of ways. For example, given a six string instrument, the split bridge 601 may be split 3:3, 2:4 or 1:5. Likewise, a seven string instrument may be split 4:3, 3:4, 2:5, etc. String height may be adjusted by replacing the bridge with a different bridge that comprises a different string height.

Now referring to FIGS. 7, 7A, 7B, 7C, 7D, 7E, 7F and 7G an embodiment of a neck guard 700 is illustrated. The neck guard 700 may comprise a clip-on plastic guard (or other suitable material) to change a feel of the neck portion of the stringed musical instrument to that of a traditional stringed musical instrument. In one embodiment, the musical instrument neck guard 700 is a formed using clear plastic that clips onto the longitudinal metal rod 106 to provide a curved radius neck so that the musical instrument feels more like a traditional musical instrument. A back side 701 of the neck guard, opposite of the front side 702 that connects to the longitudinal metal rod, may comprise a curved radius similar to a traditional musical instrument that is comfortable to the hand. In some embodiments, the curved radius is approximately in the range of 1 inch to over 4 inches, depending on the shape desired. In some embodiments, the radius may comprise a compound radius. Furthermore, non-circular profiles may also be used such as, but not limited to, a V shape, a C shape, a D shape, or an asymmetric profile.

The front side 702 of the neck guard 700 may clip over the longitudinal metal rod 106 of the musical instrument in such a manner that it will not fall off or slide under normal use, but can be removed by prying it off of the musical instrument neck by hand if so desired. The neck guard 700 may comprise a longitudinal groove 703 to couple the neck guard 700 to the longitudinal metal rod 106. The longitudinal groove 703 may be slightly undersized compared to a diameter of the longitudinal metal rod 106 in order for the neck guard 700 to securely couple the longitudinal metal rod 106 (e.g., snap into place). The longitudinal groove 703, in one embodiment, may be c-shaped. A slight interference fit between the neck guard 700 and back edges 706 of the ends of the frets may acts to stabilize the neck guard 700 from pivoting while attached to the longitudinal metal rod. In one embodiment, to remove the neck guard, two finger-pry locations 704 located near the bridge-end of the neck may be provided. These locations 704 may allow a user to pry the neck guard 700 off of the longitudinal metal rod 106 using one or more fingers. The neck guard 700 may also comprise two acoustic grooves 705 running a length of the neck guard 700 that may alter a tone of the musical instrument by accenting mid-range frequencies of the sound produced by the musical instrument. The neck guard 700, when not constructed of opaque materials, may also be illuminated by light source(s) to provide a glowing effect, if desired.

Now referring to FIGS. 8, 8A, 8B and 8C strap anchors according to some embodiments are illustrated. Strap anchors may facilitate coupling of a musical instrument strap to a musical instrument. A first strap anchor 801 may be located at the tip of the headstock (e.g., a distal end of the neck). A second strap anchor 802 may be located near the ebox ¼" jack port. A third strap anchor 803 may comprise a removable knob on the ebox that allows yet another option to a user for a strap point. The strap anchors may be exchangeable with other shapes that might be used without affecting the function.

A strap anchor system 850 may also facilitate coupling of a musical instrument strap to a musical instrument. The strap anchor system 850 may comprise a strap arm 851 that is connected to the main body of the stringed musical instrument by a strap arm wheel 852, which can be rotated to an angle 857 desired by a user and locked in place using a screw 853 that tensions the strap arm wheel 852. The strap arm wheel 852 may rotate allowing a user to position the strap arm 851 in a desired location. Distal ends of the strap arm 851 may comprise strap anchors 855 to removably couple a musical instrument strap (e.g., a guitar strap). The strap anchors 855 may be used in conjunction with the strap anchors 801/802/803. In addition, a second screw, the strap arm position screw 856, may be loosened/tightened to allow a position and balance angle 858 of the strap arm 851 to be varied and locked in place to a user's preference. A strap anchor 855 closest to the stringed musical instrument neck may be supported over approximately the mid-region of the stringed musical instrument neck to provide a natural feeling balance point for the stringed musical instrument. A third screw 854 may be used for an attachment to push the musical instrument away a the user's body, or for other features.

Figure 9:
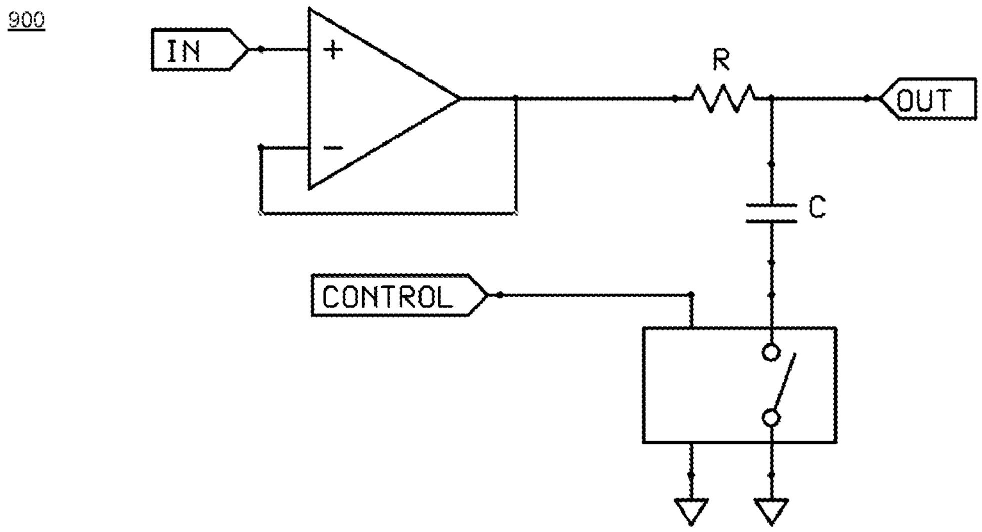
FIG. 9 illustrates a circuit according to some embodiments.

Now referring to FIG. 9, an embodiment of a circuit 900 is illustrated. In some embodiments, the circuit 900 may comprise a switching circuit that is associated with a musical instrument digital interface ("MIDI") switch. MIDI systems typically identify a note played based on the system's ability to determine a fundamental frequency associated with the note. If too much high harmonic content is present, a MIDI system may erroneously decide that a different note was played based on the harmonics that are present. A low pass filter may be implemented on multi-channel outputs of a musical instrument in order to reduce high harmonic content and improve MIDI tracking. To prevent this low pass filtering from interfering with the ability to obtain a clean, unfiltered output signal, a circuit 900 may be used to enable or disable the filter bank as a user sees fit. The circuit 900 may comprise solid-state analog switches to simultaneously ground or float each capacitor in an R-C filter on each channel. The circuit 900 may utilize a control signal to either open or close an analog switch, thereby effectively grounding or floating the capacitor terminal, and employing the filter or not, respectively. In some embodiments, each channel of a multi-channel output may comprise the circuit 900.

Figure 10:
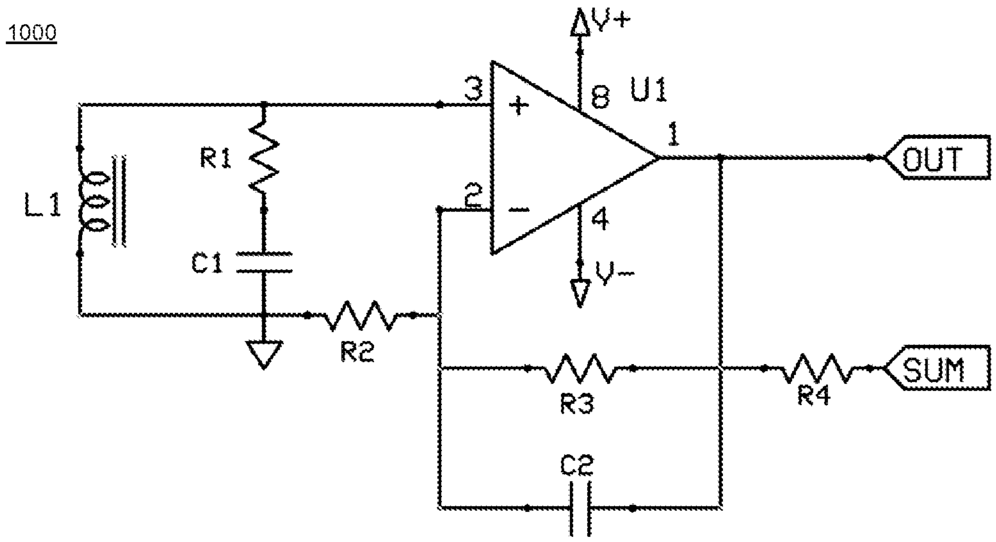
FIG. 10 illustrates a circuit according to some embodiments.

Now referring to FIG. 10, an embodiment of a circuit 1000 is illustrated. In some embodiments, the circuit 1000 may relate to a pre-amplifier circuit. A musical instrument pickup, L1, such as, but not limited to the musical instrument pickups described with respect to FIG. 3, may comprise a plurality of windings of fine wire on a magnet core and thus may have significant inductance and series resistance. A single musical instrument pickup typically covers all strings simultanesouly with a single output signal and may typically have inductance on an order of 1-10 Henry. This inductance, which may comprise a series winding resistance of several kilo-ohms, as well as an inter-winding capacitance of the pickup combined with the capacitance of the musical instrument cable act to form a low-Q resonant filter that contributes to a tone of an electric musical instrument with a resonant frequency in the range of 2 kHz-5 kHz, and Q-factor of 1-5. Since the musical instrument pickup L1 may focus on just a single string, it therefore may be significantly smaller than conventional pickups and thus its intrinsic inductance may be much lower, on the order of 0.1 Henry. Capacitor C1 may work in conjunction with L1 and R1 to form a resonant filter with low Q-factor that serves to create tonal characteristics similar to a typical electric musical instrument. U1 may act as a simple non-inverting amplifier with C2 functioning as an additional low pass filter, which may be used as a model for a musical instrument cable in a standard, passive musical instrument pickup, thus effectively implementing another flexible filter. The OUT signal may be one of the multi-channel outputs that then passes to the MIDI/Clean filter switch (as described with respect to FIG. 9). The SUM signals from each channel may be combined to form a mono signal. The mono signal may pass through a volume control and tone control circuitry and then be sent to both a D-13 jack and a ¼" jack.

Figure 11:
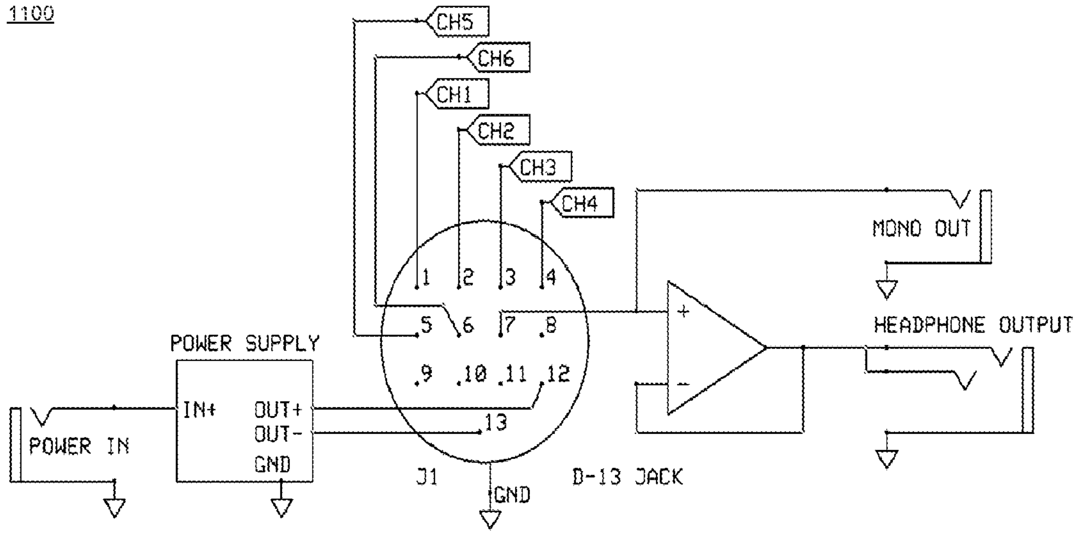
FIG. 11 illustrates a circuit according to some embodiments.

Now referring to FIG. 11, an embodiment of an external power supply circuit 1100 is illustrated. In some embodiments, in order to provide a convenient source of power for the musical instrument in an absence of either a computer interface or MIDI controller system, a small external box with a D-13 jack that may be utilized to (i) provide power to the musical instrument via 13-pin cable, (ii) a mono signal out, (iii) an optional multi-channel signal output, and (iv) a headphone output for convenient, non-disruptive playing may be provided. The external box may be powered by a wall-mounted power transformer, and may be able to operate via many common wall transformer power supplies used with typical musical instrument stomp pedals. The external box may comprise a D-13 jack and a power switch on the front of the box. In some embodiments, a rear side of the box may comprise a power input jack, a headphone output jack, and a mono output jack which may comprise the summation of the multi-channel outputs from the musical instrument.

The external box may comprise the external power supply circuit 1100. Circuit 1100 may be external to a musical instrument. As illustrated, the external power supply circuit 1100 comprises an input power that is DC positive, which may be inverted and split into a bipolar power supply providing approximately +/−7 volts DC, as per the MIDI standard at up to several hundred milliamperes of current to the musical instrument via pins 12, 13, and GND on the D-13 jack. The multi-channel signals, denoted by CH1 through CH6, for example, may be available as outputs on a circuit board. One or two operational amplifiers may provide a buffered, low impedance source suitable for driving stereo headphones using a mono, summed output on pin 7 of the D-13 jack, which comes from the musical instrument.

Figure 12:
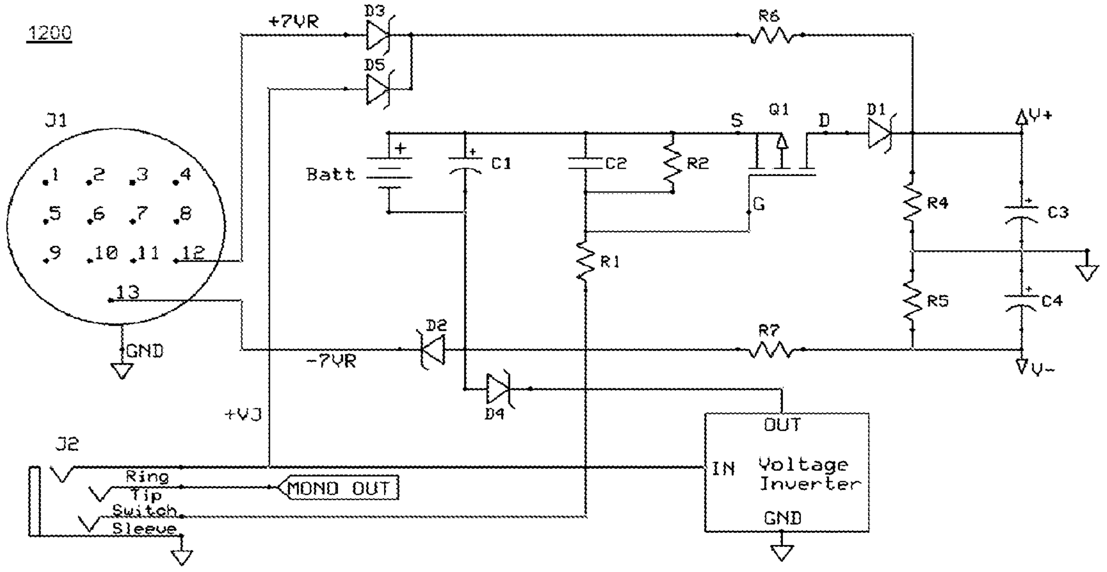
FIG. 12 illustrates a circuit according to some embodiments.

Now referring to FIG. 12, an embodiment of a circuit 1200 is illustrated. Circuit 1200 may be internal to a musical instrument. In some embodiment, the circuit 1200 may relate to a battery engagement circuit. As stated previously, the power sources used to power the active electronics may comprise an internal battery or an external source such as, but not limited to, a powered ¼" cable that may be plugged into a ¼" jack associated with the musical instrument or from an external source via a D-13 jack.

The fretmarker lighting, as described above, may only be activated when an external source is used in order to prevent unnecessary drain on the internal battery. The circuit 1200 may disengage the internal battery in the presence of an external source via a MOSFET transistor configured to operate as a switch. External power sources may include, but are not limited to, a MIDI controller system, a computer interface box, or the external box as describe above with respect to FIG. 11.

The internal battery may comprise one or more lithium coin-cell type batteries stacked in series to provide approximately 3 volts to 10 volts at full charge. As the internal battery wears down, a voltage may decrease until the circuit 1200 no longer functions. With no plug inserted into jack J2, the internal battery may be disengaged from the circuit because there is no current in R1, and thus R2 pulls the gate (G) of enhancement-mode P-type MOSFET Q1 equal to the voltage at the source (S) of Q1, to shut off the flow of current from the source to drain (D) terminals.

When no plug is inserted in J1 (e.g., the D-13 connector), but a mono tip-sleeve-type plug is inserted in J2 with (no ring terminal), the switch terminal on J2 shorts to GND pulling current through R1, and creating a voltage difference from the gate of Q1 to the source of Q1, creating a low-resistance channel from the source to the drain of Q1 if this voltage difference exceeds the threshold turn-on voltage of Q1, typically 0.5 volt to 2 volts. Capacitor C2 and R1 form a turn-on circuit that may reduce the in-rush current as C3 and C4 charge up. Capacitor C1 may assist in delivery of in-rush current to C3 and C4, thereby limiting a short-term current draw requirement on the internal battery. R1 and R2 may be chosen for very low current draw, typically in the range of 100 kilo-Ohms to several Mega-Ohms. Resistors R4 and R5 may be of equal value so that capacitors C3 and C4 may also be of equal value, charge to an equal but opposite voltage to create a bipolar power supply for the audio section of the musical instrument. The function of R4, R5, C3 and C4 may be maintained regardless of the power delivery method utilized.

When no plug is inserted in J2, but a plug is inserted in J1 with applied power at pins 12 and 13 of approximately +7 volts and −7 volts respectively (with 0 volts at GND), as per the MIDI standard, C3 and C4 may charge up at a rate limited by R6 and R7 to prevent a sudden turn-on "pop" sound.

With a plug inserted at J1 and powered, if a second plug is now inserted at J2, thereby shorting the switch terminal to GND, Q1 may or may not turn on, depending on the voltage present at the battery; but in either case, the voltage at the positive supply terminal V+ may be more positive than the "+" terminal of the internal battery, hence D1 may be off and conduct no current, hence preserving the life of the internal battery in the presence of an external power source. If power is additionally and redundantly present on the ring terminal of J2, a voltage inverter may convert the positive DC voltage to a negative DC voltage so that a bipolar supply is created. Depending on if this new bipolar supply is higher in magnitude than the voltage present on J1 pins 12 and 13, diodes D1, D2, D3, D4, and D5 effectively disengage the lower voltage supply from the circuit, thereby preventing the possibility of a circuit fault.

The following illustrates various additional embodiments and do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

What is claimed is:

1. A stringed musical instrument comprising:

a neck portion comprising (i) a front side that includes a plurality of metal frets and (ii) a back side that includes a longitudinal metal rod, wherein the plurality of metal frets are coupled to a top side of the longitudinal metal rod and wherein a distal fret of the plurality of metal frets comprises a zero fret;

a body portion coupled to the neck portion;

a strap anchor system comprising a strap arm and strap arm wheel wherein the strap arm wheel is directly attached to the body portion and the strap arm extends through the strap arm wheel;

a string peg disposed through the longitudinal metal rod wherein the string peg includes a plurality of openings to receive a plurality of strings; and a plurality of set screws coupled to a bottom side of the longitudinal metal rod to lock each of the plurality of strings into place wherein the plurality of set screws is disposed below the zero fret.

2. The stringed musical instrument of claim 1, further comprising a tensioning screw to tension the strap arm wheel, wherein the body comprises a plurality of longitudinally disposed pickups coupled to the longitudinal metal rod to form the body portion.

3. The stringed musical instrument of claim 2, wherein each of the plurality of longitudinally disposed pickups comprises a magnet and a magnetic pole piece extending a length of the pickup.

4. The stringed musical instrument of claim 1, further comprising:

a neck guard removably attached to the longitudinal metal rod, wherein the neck guard comprises a first side that includes a longitudinal indentation to couple the longitudinal metal rod and a second side that comprises a curved radius, wherein the neck guard is coupled to the back side of the neck portion.

5. The stringed musical instrument of claim 4, wherein the first side of the neck guard does not extend between the plurality of metal frets.

6. The stringed musical instrument of claim 1, further comprising:

a plurality of strap anchors.

7. The stringed musical instrument of claim 1, wherein a distal end of the strap arm comprises a strap anchor.

8. The stringed musical instrument of claim 1, further comprising:

a plurality of LED fretmarker lights.

9. The stringed musical instrument of claim 8, wherein the plurality of fretmarker lights is activated when an external power source is connected to the stringed musical instrument.

10. A stringed musical instrument comprising:

a neck portion comprising a longitudinal metal rod that includes (i) a front side coupled to a plurality of metal frets and (ii) a back side;

a body portion coupled to the neck portion, wherein the body comprises a plurality of longitudinally disposed pickups coupled to a longitudinal metal rod to form the body portion and wherein each of the plurality of longitudinally disposed pickups comprises a magnet and a magnetic pole piece extending a length of the pickup;

a strap anchor system comprising a strap arm and a strap arm wheel wherein the strap arm wheel is directly attached to the body portion and the strap arm extends through the strap arm wheel;

a string peg disposed through the longitudinal metal rod, wherein the string peg includes a plurality of openings to receive a plurality of strings;

a plurality of screws coupled to the back side of the longitudinal metal rod to secure each of the plurality of strings; and a neck guard removably attached to the longitudinal metal rod wherein the neck guard comprises a front side that includes a longitudinal indentation to couple the longitudinal metal rod and a back side that comprises a curved radius, wherein the neck guard is coupled to a back side of the neck portion.

11. The stringed musical instrument of claim 10, further comprising a plurality of LED fretmarker lights disposed within the longitudinal metal rod wherein the plurality of fretmarker lights is activated when an external power source is connected to the stringed musical instrument.

12. The stringed musical instrument of claim 10, wherein a distal end of the strap arm comprises a strap anchor.

13. A stringed musical instrument comprising:

a neck portion comprising a longitudinal metal rod that includes (i) a front side coupled to a plurality of metal frets and (ii) a back side, wherein a distal fret of the plurality of metal frets comprises a zero fret;

a body portion coupled to the neck portion;

a strap anchor system attached to the body portion comprising a strap arm and strap arm wheel, wherein the strap arm wheel is directly attached to the body portion and the strap arm extends through the strap arm wheel;

a tensioning screw to tension the strap arm wheel;

a string peg disposed through the longitudinal metal rod wherein the string peg includes a plurality of openings to receive a plurality of strings; and a plurality of set screws coupled to the back side of the longitudinal metal rod to secure each of the plurality of strings wherein the plurality of set screws is disposed below the zero fret.

14. The stringed musical instrument of claim 13, further comprising a plurality of fretmarker lights disposed within the longitudinal metal rod, wherein the plurality of fretmarker lights is activated when an external power source is connected to the stringed musical instrument.

15. The stringed musical instrument of claim 13, wherein the body comprises a plurality of longitudinally disposed pickups coupled to the longitudinal metal rod to form the body portion and wherein each of the plurality of longitudinally disposed pickups comprises a magnet and a magnetic pole piece extending a length of the pickup.

16. The stringed musical instrument of claim 13:

wherein the neck portion and the body portion are comprised of titanium.

* * * * *